United States Patent
Mhatre et al.

(10) Patent No.: US 9,723,642 B2
(45) Date of Patent: Aug. 1, 2017

(54) METHOD AND DEVICE FOR MANAGING COMMUNICATION SESSIONS USING TUNNELS

(71) Applicant: AT&T Intellectual Property I, LP, Atlanta, GA (US)

(72) Inventors: Vivek Mhatre, Seattle, WA (US); Gaurav Gupta, Redmond, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 191 days.

(21) Appl. No.: 14/453,957

(22) Filed: Aug. 7, 2014

(65) Prior Publication Data

US 2016/0044721 A1    Feb. 11, 2016

(51) Int. Cl.
*H04W 12/08* (2009.01)
*H04W 72/04* (2009.01)
*H04W 76/02* (2009.01)
*H04L 5/00* (2006.01)
*H04L 29/06* (2006.01)

(52) U.S. Cl.
CPC ......... *H04W 76/022* (2013.01); *H04L 5/0092* (2013.01); *H04L 65/102* (2013.01); *H04L 65/1016* (2013.01)

(58) Field of Classification Search
CPC ............... H04W 76/022; H04W 40/24; H04W 28/0226; H04W 76/041; H04W 40/02; H04L 12/4633
USPC ........................................ 370/331, 329, 220
See application file for complete search history.

(56) References Cited

U.S. PATENT DOCUMENTS

| | | | |
|---|---|---|---|
| 7,120,136 B2 | 10/2006 | Upp et al. | |
| 8,121,146 B2 | 2/2012 | Sood et al. | |
| 8,477,771 B2 | 7/2013 | Biswas et al. | |
| 8,595,357 B2 | 11/2013 | Biswas et al. | |
| 2010/0150049 A1* | 6/2010 | Kim ................... | H04W 76/022 370/312 |

(Continued)

FOREIGN PATENT DOCUMENTS

| | | |
|---|---|---|
| WO | 2012138155 A2 | 10/2012 |
| WO | 2012149322 A1 | 11/2012 |

(Continued)

OTHER PUBLICATIONS

Cheon, Kyung-Yul et al., "Dual Tunnelling Mechanism for Mobile IP Based 3G LTE-WLAN Handover", Vehicular Technology Conference, 2008. VTC 2008-Fall. IEEE 68th. IEEE, 2008.

(Continued)

*Primary Examiner* — Charles C Jiang
*Assistant Examiner* — Will Lin
(74) *Attorney, Agent, or Firm* — Guntin & Gust, PLC; Joseph Hrutka

(57) ABSTRACT

Aspects of the subject disclosure may include, for example, receiving a first request for resource release associated with a communication device where the first request is received from a network node, storing tunnel identification information for a downlink tunnel associated with the communication device and the network node, providing a second request responsive to the first request, and marking the tunnel identification information as inactive responsive to the first request. Other embodiments are disclosed.

20 Claims, 8 Drawing Sheets

(56) References Cited

U.S. PATENT DOCUMENTS

| | | | |
|---|---|---|---|
| 2010/0322189 A1* | 12/2010 | Qiang | H04L 63/029 370/331 |
| 2012/0159151 A1* | 6/2012 | Janakiraman | H04L 43/028 713/153 |
| 2012/0269167 A1* | 10/2012 | Velev | H04W 36/0011 370/331 |
| 2012/0300655 A1 | 11/2012 | Lee et al. | |
| 2013/0028161 A1 | 1/2013 | Maeda et al. | |
| 2013/0058292 A1* | 3/2013 | Wang | H04W 76/041 370/329 |
| 2013/0072222 A1* | 3/2013 | Weill | H04W 64/00 455/456.1 |
| 2013/0142166 A1* | 6/2013 | Bogineni | H04W 8/02 370/331 |
| 2013/0150024 A1 | 6/2013 | Burbidge et al. | |
| 2013/0163537 A1 | 6/2013 | Anderson et al. | |
| 2013/0201924 A1* | 8/2013 | Song | H04W 76/02 370/329 |
| 2013/0272181 A1 | 10/2013 | Fong et al. | |
| 2013/0322276 A1 | 12/2013 | Pelletier et al. | |
| 2014/0003357 A1* | 1/2014 | Ejzak | H04W 76/021 370/329 |
| 2014/0082159 A1 | 3/2014 | Wu et al. | |
| 2014/0098761 A1 | 4/2014 | Lee et al. | |
| 2014/0105145 A1* | 4/2014 | Gao | H04W 84/045 370/329 |
| 2014/0187245 A1* | 7/2014 | Xu | H04W 36/0016 455/436 |
| 2014/0204864 A1* | 7/2014 | M | H04W 76/022 370/329 |
| 2015/0063113 A1* | 3/2015 | Yoshida | H04L 41/5022 370/235 |
| 2015/0085845 A1* | 3/2015 | Wang | H04W 76/022 370/338 |
| 2015/0327032 A1* | 11/2015 | Hedman | H04W 76/046 370/329 |
| 2016/0157164 A1* | 6/2016 | Lee | H04W 48/16 370/329 |
| 2016/0212654 A1* | 7/2016 | Itoh | H04W 28/18 |
| 2016/0249259 A1* | 8/2016 | Park | H04W 36/00 |

FOREIGN PATENT DOCUMENTS

| | | |
|---|---|---|
| WO | 2012174222 A1 | 12/2012 |
| WO | 2013052136 A1 | 4/2013 |
| WO | 2013096555 A1 | 6/2013 |
| WO | 2014042377 A1 | 3/2014 |
| WO | 2014051387 A1 | 4/2014 |

OTHER PUBLICATIONS

Dornal, Santosh, "LTE Handovers", Wired N Wireless, Monday, Jun. 15, 2009. http://wired-n-wireless.blogspot.com/2009/06/lte-handovers.html.

Kreher, Ralf et al., "LTE signaling: troubleshooting and optimization", John Wiley & Sons, 2010.

* cited by examiner

300

METHOD AND DEVICE FOR MANAGING COMMUNICATION SESSIONS USING TUNNELS

FIELD OF THE DISCLOSURE

The subject disclosure relates to a method and device for managing communication sessions using tunnels.

BACKGROUND

Communication devices engage in various communication services which can be initiated and ended at various times. Service requests can be user-based or can be network-based. To establish communications for a communication device, various signaling is transmitted between network devices and/or the communication device(s). During a single communication session, use of network devices can be transitioned, such as for a mobile end user device that is moving from one coverage area to another coverage area. As the number of end user devices and/or communication services grows, the demand placed on resources of the networks also grows.

BRIEF DESCRIPTION OF THE DRAWINGS

Reference will now be made to the accompanying drawings, which are not necessarily drawn to scale, and wherein.

DETAILED DESCRIPTION

Figure 1:
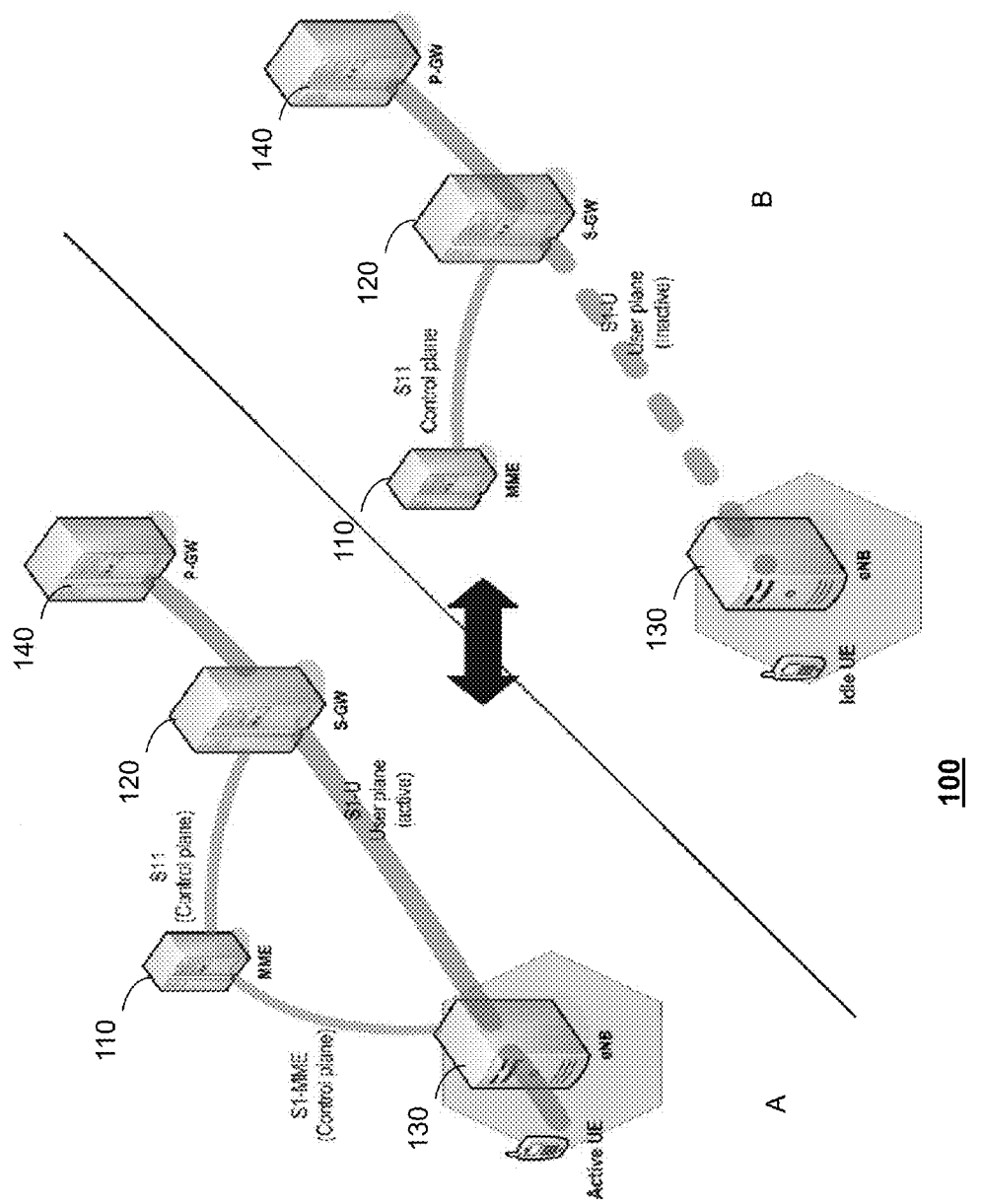
FIG. 1 depicts an illustrative embodiment of a system that manages communication services utilizing persistent tunneling.

The subject disclosure describes, among other things, illustrative embodiments for management by the Mobility Management Entity (MME) of tunnels between the Serving Gateway (SGW) and a network node, such as an Evolved Universal Terrestrial Radio Access Network (E-UTRAN) Node (eNB). In one or more embodiments, one or more tunnels for an end user device can be switched between active and inactive states (rather than or in addition to deleting and re-establishing some or all of the tunnels). The switching of the tunnel states can correspond to a transition of the end user device between idle and active states. The tunnels can be of various types, including user plane tunnels and/or tunnels that utilize General Packet Radio Service (GPRS) Tunneling Protocol (GTP). The tunnels can enable the network to provide various communication services to one or more communication devices (e.g., end user devices) including voice, video, data and/or messaging services. Other embodiments are described in the subject disclosure.

One or more aspects of the subject disclosure include multiple tunnels being maintained for the end user device where one or more of the tunnels are in an active state and one or more of the other tunnels are in an inactive state, for example, one tunnel being active while the other tunnels are inactive. In one or more embodiments, the MME, the eNB and/or the SGW can mark or otherwise annotate the tunnel(s) as active or inactive while still retaining tunnel identification information, such as the Tunnel ID values of the other endpoint. When the end user device is on the same eNB, the state of these tunnels can be switched between active or inactive based on the end user device state being active or inactive. In one or more embodiments, Modify Bearer Requests and/or Responses (MBR) signaling between the MME and the SGW can be reduced or eliminated through retaining the tunnel identification information and marking tunnels as active or inactive. In one or more embodiments, persistent tunnels can be maintained for an end user device for up to a particular number (K) of last known eNBs (e.g., neighboring eNBs) of the end user device. In one embodiment, if the end user device has moved out of a coverage area of the K eNBs, then the MME can utilize MBR signaling to set up a new tunnel with the new eNB and the SGW.

One embodiment of the subject disclosure is a method that includes receiving, by a mobility management entity server comprising a processor and a memory, a first request for resource release associated with a communication device where the first request is received from a network node. The method can include storing, by the mobility management entity server in the memory, tunnel identification information for a downlink tunnel associated with the communication device and the network node. The method includes providing, by the mobility management entity server to a serving gateway, a second request responsive to the first request. The method can include marking, by the mobility management entity server, the tunnel identification information as inactive responsive to the first request.

One embodiment of the subject disclosure includes a machine-readable storage device, comprising executable instructions that, when executed by a processor of a serving gateway, facilitate performance of operations. The serving gateway can receive a request associated with a communication device, where the request is received from a mobility management entity server, and where the request is associated with a resource release message generated by a network node. The serving gateway can store tunnel identification information for a downlink tunnel associated with the communication device and the network node and can mark the tunnel identification information as inactive responsive to the request.

One embodiment of the subject disclosure includes a communication device having a processor and a memory that stores executable instructions that, when executed by the processor, facilitate performance of operations. The processor can provide a service request to a network node, where the providing of the service request causes the network node to facilitate establishing a communication session for the communication device utilizing tunnel identification information for an inactive tunnel without a modify bearer request and a modify bearer response being transmitted between a mobility management entity server and a serving gateway. The tunnel identification information can be stored at the mobility management entity server and the serving gateway; and can provide communication services via the communication session.

FIG. 1 depicts an illustrative embodiment of a communication system 100 that provides communication services to communication devices, including wireless communication services. The communication devices can be various types of devices, including end user devices, such as mobile phones, tablets, laptop computers, desktop computers, set top boxes, personal digital assistants, vehicle navigation systems, and so forth. System 100 can include various network elements including MME 110, SGW 120, eNB 130, and Packet Data Network Gateway (PGW) 140. Various other devices can also be utilized to facilitate establishing communications for the communication devices, including routers, switches and so forth.

In the example of FIG. 1, a state transition is illustrated from an active user plane at A to an inactive user plane at B. This example shows a GTP tunnel which is defined by tunnel endpoints at eNB 130 (downlink) and at SGW 120 (uplink), and there is one tunnel for each data bearer. In one or more embodiments other tunneling protocols can also be utilized. System 100 can utilize tunnel identification information, such as persistent downlink GTP Tunnel IDs (TEIDs), to facilitate establishing communication services for one or more communication devices. As an example, in an active to inactive (or idle) transition, when an inactivity timer for an active end user device expires on the eNB 130, the eNB can perform a resource release request, such as an S1-Release, towards the MME 110. The eNB 130 can releases Radio Access Network (RAN) resources, but can retain the TEID for all bearers of this end user device (i.e., the TEID is persistent). The MME 110 can send a Release Access Bearer request or message with a persistence flag indicating the TEID is to be persistent (e.g., set to one) to the SGW 120. Both the MME 110 and the SGW 120 can retain the S1-U downlink TEIDs for this end user device towards the particular eNB 130, and can also mark or otherwise annotate the TEIDs as inactive.

In one embodiment, if the end user device goes active via a UE-triggered Service Request, system 100 can facilitate establishing communications without transmission of MBR signaling between the MME 110 and the SGW 120. For example, when uplink data begins to flow, the SGW 120 can mark all the downlink TEIDs corresponding to this end user device-eNB combination as active and the SGW can start using the corresponding tunnel(s) for downlink traffic. The MME 110 can mark all the downlink TEIDs of this end user device as active, such as after sending a Service Accept message.

In one embodiment, if the SGW 120 receives downlink traffic for an inactive or idle end user device, the SGW can determine that all UE bearers are in an inactive mode, and can trigger paging via a downlink data notification packet to the MME 110. In system 100, a low mobility or stationary end user device that stays in coverage of a single eNB most of the time can benefit from a persistent downlink GTP tunnel where core network signaling during UE-triggered Service Requests can be reduced or eliminated.

System 100 enables user plane traffic of a user to be carried between the eNB 130 and the SGW 120 using tunnels, such as GTP tunnels. To save radio and computing resources on the eNB, when the user has been inactive for a particular duration (e.g., 10 seconds), a resource release can be requested. In one or more embodiments, rather than performing a tear-down of the tunnel(s) between the eNB 130 and the SGW 120 for this user responsive to a transition from active to inactive, the system 100 can mark a tunnel as inactive while maintaining tunnel identification information in various devices that are utilized in managing the tunnels, such as the MME 110, the SGW 120, and/or the eNB 130. The tunnel identification information can be the same for each of the MME 110, the SGW 120, and/or the eNB 130 or can be limited to tunnel identification information that is utilized by the particular device when the tunnel is to be re-activated, such as identification information for the other endpoint.

Figure 2:
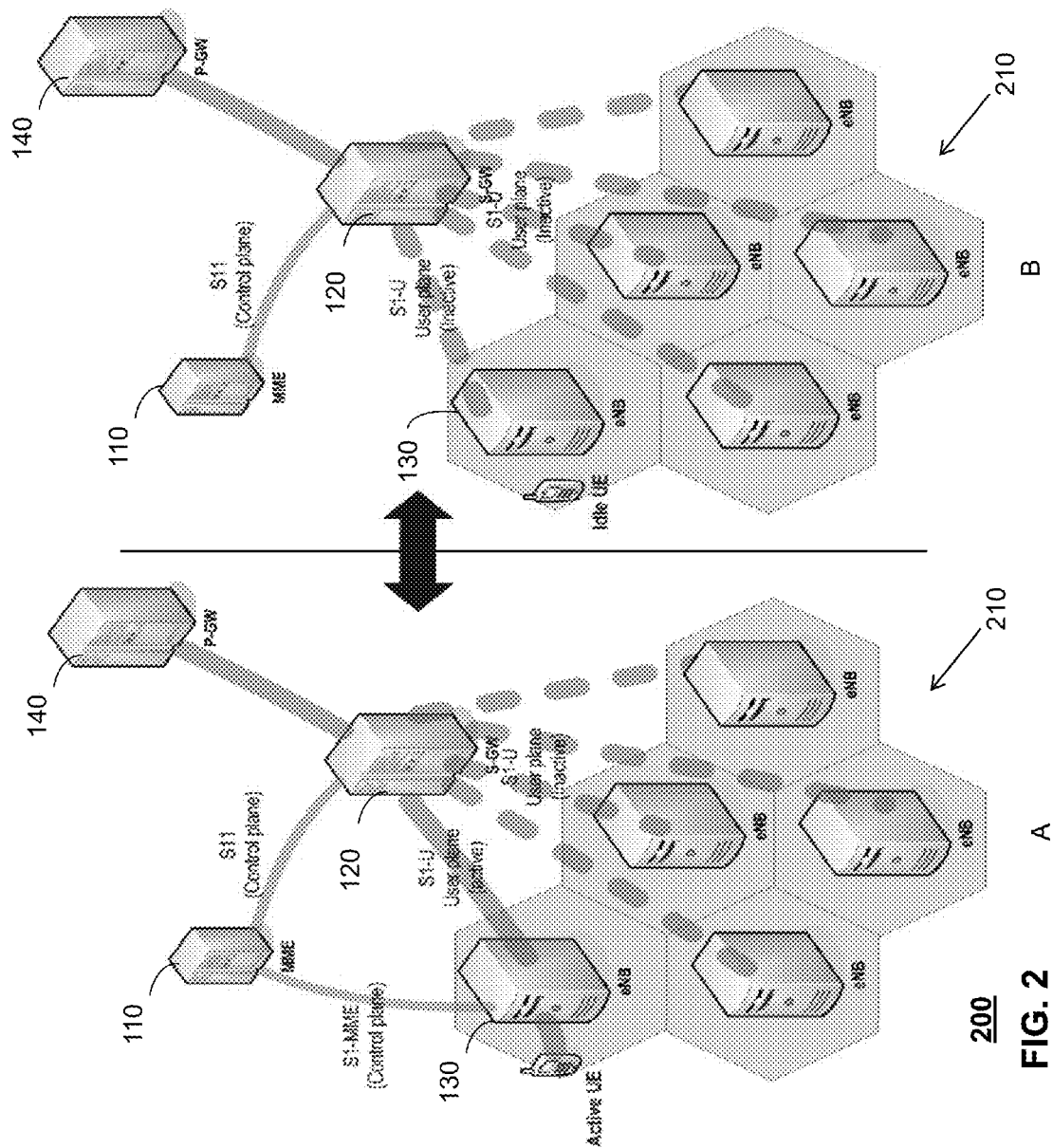
FIG. 2 depicts an illustrative embodiment of a system that manages communication services utilizing multiple persistent tunnels.

FIG. 2 depicts an illustrative embodiment of a communication system 200 that provides communication services to communication devices, including wireless communication services. The communication devices can be various types of devices, including end user devices, such as mobile phones, tablets, laptop computers, desktop computers, set top boxes, personal digital assistants, vehicle navigation systems, and so forth. System 200 can include various network elements including MME 110, SGW 120, eNB 130, and Packet Data Network Gateway (PGW) 140. Various other devices can also be utilized to facilitate establishing communications for the communication devices, including routers, switches and so forth.

In the example of FIG. 2, a state transition is illustrated from an active device at A to an inactive device at B where multiple tunnels are maintained in an active or inactive state. This example shows GTP tunnels which are defined by tunnel endpoints at eNBs 130 (downlink) and at SGW 120 (uplink), and there can be one tunnel for each data bearer. In one or more embodiments other tunneling protocols can also be utilized. System 200 makes use of a typical low/medium mobility end user device spending significant amount of contiguous time on a small subset of eNBs 210 (one of which is eNB 130). Instead of retaining persistent downlink TEIDs for an end user device on a single eNB, system 200 enables retaining tunnel identification information, such as persistent downlink TEIDs, for an end user device on a set of K last known eNBs 210.

In this embodiment, as the end user device moves from cell to cell, it has concurrent downlink S1-U TEIDs on up to K last known eNBs 210 (e.g., K=5). The MME 110 and/or the SGW 120 can store these K TEIDs for each bearer of the end user device. If a UE-triggered Service Request originates from one of the K eNBs 210 that have pre-established GTP TEIDs at the MME 110 and the SGW 120, communication services can be established without MBR signaling messages between the MME 110 and the SGW 120. If a change from active to inactive state for the end user device is detected (e.g., expiration of an inactivity timer at the eNB 130) then the tunnel identification information associated with the end user device and with the eNB 130 can be marked as inactive by the MME and SGW. The particular number (K) of last utilized eNBs for which the tunnel identification information will be stored by the MME, the SGW and/or the eNBs can vary based on a number of different factors, including QoS agreements, communication service type, network resource usage, network conditions, device type, device identity, subscription information, historical mobility of the communication device, and so forth.

If a UE-triggered Service Request of the end user device is from an eNB that is not in the existing list of K eNBs 210 for this UE then the MME 130 can send a fresh MBR to SGW 120, while the new eNB creates a new persistent TEID entry for this end user device. In this embodiment, the MME 110 and the SGW 120 can replace the oldest known eNB from their list of K eNBs 210 for this UE with this new eNB.

In one or more embodiments, each eNB 210 can maintain an expiry timer for persistent TEIDs. For example, if there is no activity on a persistent TEID until expiry of the timer, the eNB assumes that the end user device has moved away from the eNB, and is unlikely to return to this eNB, and so deletes this TEID+UE association. When the end user device leaves the MME/SGW (inter-pool TAU), the persistent TEID information can be flushed. In another embodiment, flushing of stale persistent entries on MME/SGW can be processed via cache management algorithms.

Figure 3:
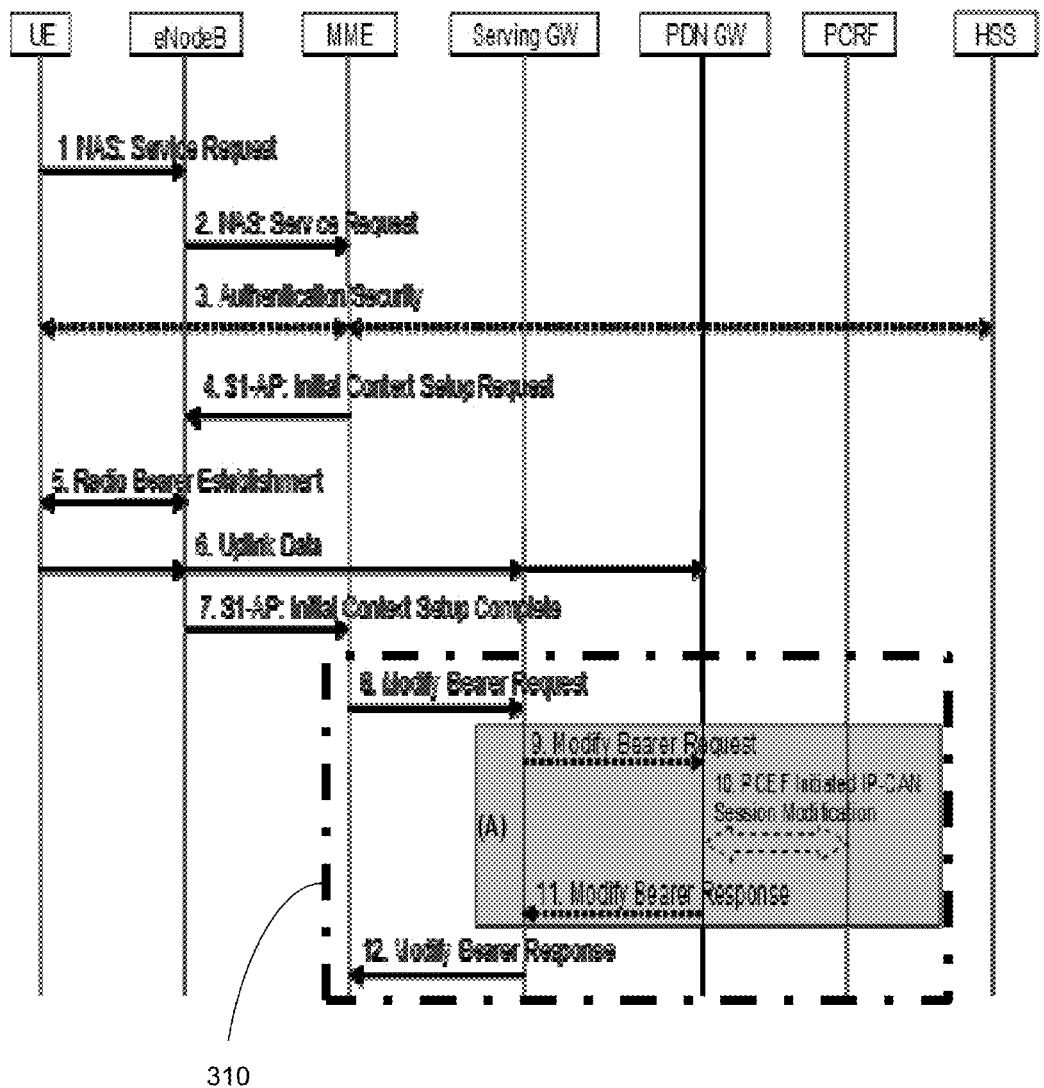
FIG. 3 depicts an illustrative embodiment of a data flow for the systems of FIGS. 1 and 2 with selective use of Modify Bearer Request/Response signaling.

FIG. 3 depicts an illustrative embodiment of signaling flow 300 based on a UE-triggered service request. In one embodiment, steps 1-7 can proceed according to the standard established by 3GPP TS 23.401 dated Jun. 24, 2014, the disclosure of which is hereby incorporated by reference. At 310, selective use of MBR signaling can be implemented. For example, if an MME, an SGW and/or an eNB has already stored tunnel identification information for a previously established tunnel that was switched to an inactive state, then at 310 the MBR signaling would not be utilized. If on the other hand, the MME, the SGW and/or the eNB has not already stored tunnel identification information for a previously established tunnel that was switched to an inactive state, then at 310 the MBR signaling would utilized. Whether or not MBR tunneling is utilized at 310 can depend on whether an eNB is part of a set of eNBs designated as last utilized eNBs that are associated with a communication device.

Figure 4:
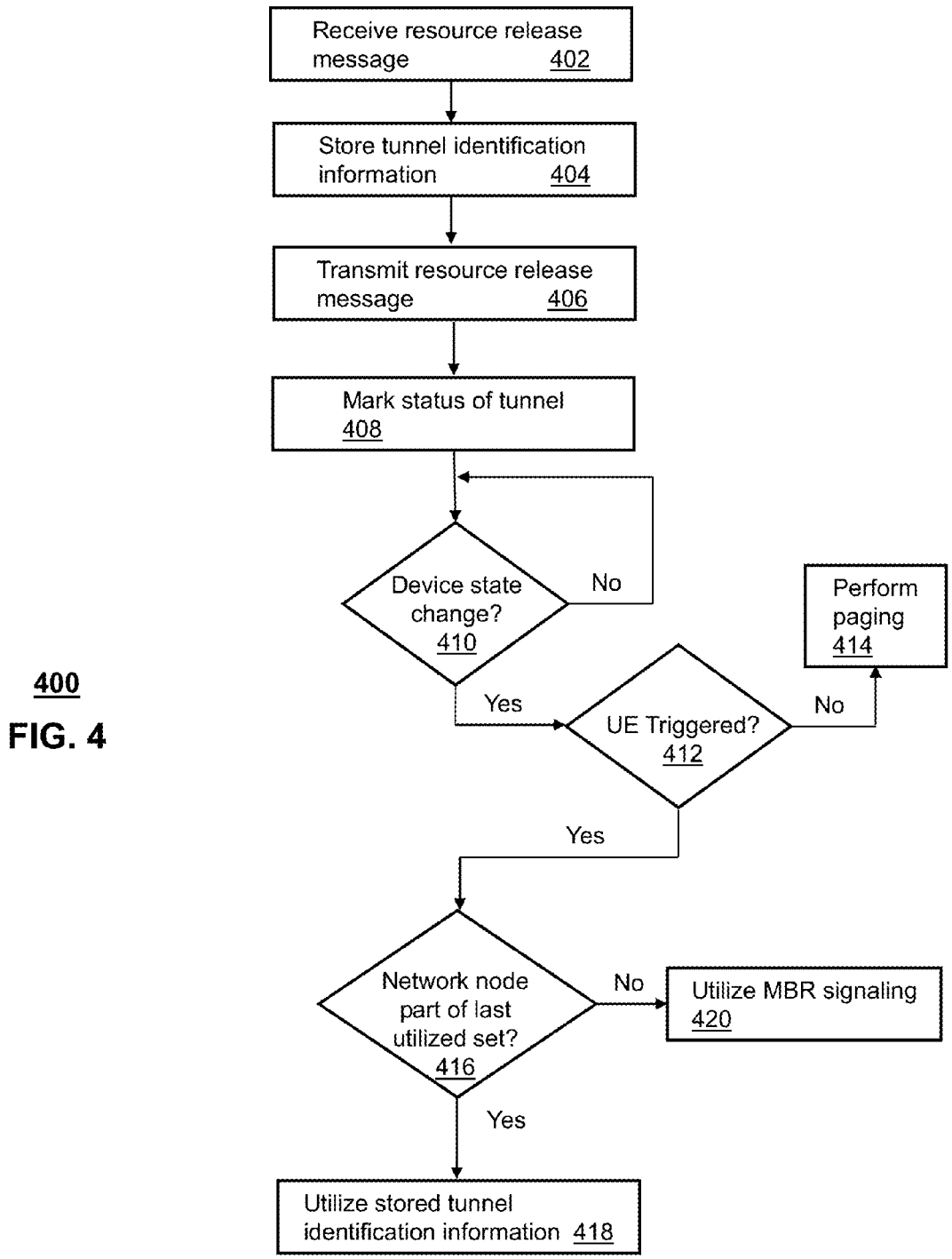
FIG. 4 depicts an illustrative embodiment of a method used in portions of the systems described in FIGS. 1 and 2.

FIG. 4 depicts an illustrative embodiment of a method 400 for providing media services by way of tunnel management. Method 400 can begin at 402 where a network server, such as an MME, receives a first request for resource release associated with a communication device (e.g., a mobile device, a laptop, a tablet, and so forth). The first request can be received from a network node, such as an eNB. At 404, the MME can store tunnel identification information for a tunnel associated with the communication device and the network node. In one embodiment, the tunnel can be a GTP downlink tunnel. The tunnel identification information can be various information including Tunnel ID values for the end point(s) of the tunnel. For instance, the MME can store tunnel ID values for the SGW of this tunnel, while the SGW stores tunnel ID values for the eNB of this tunnel. At 406, the MME can provide an SGW with a second request, for example, in response to the MME receiving the first request. At 408, the MME can mark or otherwise annotate the tunnel identification information as being inactive, for example, in response to the MME receiving the first request. The marking of the tunnel identification information as inactive can also be performed by other devices, such as the SGW or the eNB, in response to inactivity of the communication device. In one embodiment, the transition of the communication device from active to inactive (or idle) can be detected based on expiration of an activity timer for the active communication device at the network node.

At 410, state change monitoring can be performed for the communication device to detect when the communication device transitions from an inactive state to an active state. The transition between states can be caused by different events, such as a service request generated by the communication device or a service request generated by the network. For example, at 412 a determination can be made as to whether there was a UE-triggered service request. If there was a UE triggered service request then the eNB can directly send data to the SGW and the SGW would know which tunnels or TEIDs to set as active (e.g., the ones corresponding to their eNB). Method 400 would continue to 416. If on the other hand, it is determined that the event was not a UE triggered service request but rather was a network triggered service request then at 414 the SGW and the MME can follow a paging procedure such as via Downlink Data Notification packet.

At 416, if a state change of the communication device to active has been detected (e.g., uplink data beginning to flow to the SGW), a determination can be made as to whether the corresponding network node (which can be a different node) is included in a set or list of network nodes that were last utilized by the communication device. As an example, the set of network nodes can be the last five network nodes that were utilized by the communication device. The particular number of nodes included in the set can vary and can be based on a number of different factors including a user's subscription agreement, a type of communication device, available network resources, network conditions, UE type, identity, subscription information, historical mobility of the communication device (e.g., if historically the communication device only utilizes three network nodes frequently then the set can be those three network nodes), and so forth.

If the network node is part of the last utilized set of network nodes then at 418 communications can be established via tunneling that utilizes stored tunnel identification information rather than transmitting MBR signals such as between the MME and the SGW. In this example, the tunnel identification information for all of the network nodes that are part of the last utilized network nodes can be stored by the various devices, including the MME, the SGW and/or the eNBs. The storage of the tunnel identification information can be all or some of the data, such as an endpoint device only storing the other endpoints tunnel ID values. Continuing with this example, the set of last utilized tunnels can be maintained (such as for a pre-determined time period) as inactive tunnels without being torn-down when not in use. These last utilized tunnels can be switched to active tunnels utilizing the stored tunnel identification information without the need for exchanging MBR signaling, such as between the MME and the SGW.

If on the other hand at 420, the network node is a new network node (e.g., the communication device has moved to a new coverage area that is remote from a previous location of last service), which is not included in the set of last utilized network nodes then MBR signaling can be utilized for creating a tunnel such as between the new network node and the SGW.

In one embodiment, a service request generated by a network device can be received by the MME where the service request is associated with a second network node, and the MME can facilitate establishing communications for the communication device via a paging procedure and through use of MBR signaling.

In one embodiment, responsive to a communication device state change, the MME can mark the tunnel identification information as active and can facilitate establishing communications for the communication device via the network node utilizing the tunnel identification information, where the providing of the second request to the SGW can cause the SGW to store the tunnel identification information.

In one embodiment, the MME (and/or the SGW and/or the eNB) can delete the tunnel identification information from its memory such as responsive to expiration of a tunnel identification information timer. In one embodiment, the tunnel identification information can be part of a set of tunnel identification information associated with the communication device, where each of the set of tunnel identification information is for a different network node.

In one embodiment, the network node can be an eNB, wherein the downlink tunnel is established according to a general packet radio service tunneling protocol, and wherein the receiving of the first request by the mobility management entity server is responsive to the network node detecting expiration of an inactivity timer for the communication device.

In one embodiment, establishing communications for the communication device via the network node can be facilitated utilizing the tunnel identification information responsive to a service request generated by the communication device, where the facilitating of the establishing communication is performed without transmitting a modify bearer request and a modify bearer response between the MME and the SGW.

In one embodiment, establishing communications for the communication device via the network node can be facilitated utilizing the tunnel identification information responsive to a service request generated by a network device, where the facilitating of the establishing communication is performed via a paging procedure and utilizes a modify bearer request and a modify bearer response between the MME and the SGW.

In one embodiment, the second request provided to the SGW can include a persistence flag indicating that the tunnel identification information is to be stored by the SGW. In one embodiment, a service request generated by the communication device can be received where the service request is associated with a second network node, and a modify bearer request can be provided from the MME to the SGW responsive to the service request and responsive to a determination that the second network node is not included in a set of network nodes that were last utilized by the communication device.

In one embodiment, a service request can be received where the service request is associated with a second network node, and establishing communications for the communication device via the second network node can be facilitated utilizing second tunnel identification information responsive to the service request and responsive to a determination that the second network node is included in a set of network nodes that were last utilized by the communication device, where the second tunnel identification information is stored in the memory by the MME for a second downlink tunnel associated with the communication device and the second network node that was previously inactive, and where the facilitating of the establishing communication is performed without transmitting a modify bearer request and a modify bearer response between the MME and the SGW.

In one embodiment, a resource release message can cause the S1-MME signaling connection between the eNB 130 and the MME 110 for the particular end user device to be released, while the tunnel identification information is retained by the relevant devices, such as the MME 110, the SGW 120 and/or the eNB 130 and while the tunnel(s) is marked as inactive.

Figure 5:
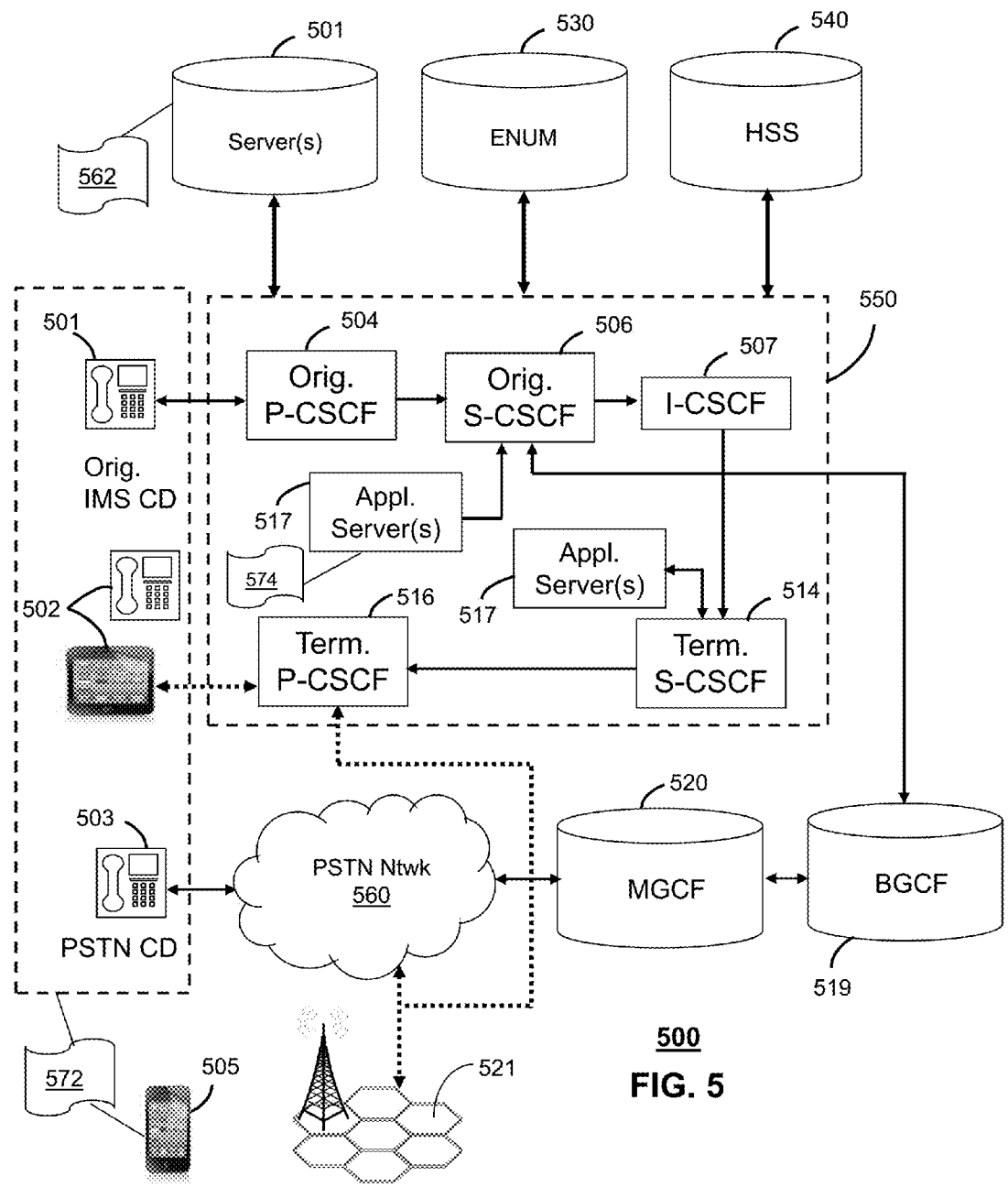
FIG. 5 depicts an illustrative embodiment of a communication system that provides communication services using one or more persistent tunnels.

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 and 200 of FIGS. 1 and 2 as another representative embodiment of communication system 500. Communication system 500 can facilitate communication services for one or more communication devices through use of one or more persistent tunnels that can be switched between active and inactive states, and that have tunnel identification information stored by various network elements, such as an MME, an SGW and/or an eNB.

For example, system 500 can enable a SGW to receive a request associated with a communication device from an MME, wherein the request is associated with a resource release message generated by a network node. The SGW can store tunnel identification information for a downlink tunnel associated with the communication device and the network node, and can mark the tunnel identification information as inactive responsive to the request. In one embodiment, the SGW can delete the tunnel identification information responsive to expiration of a tunnel identification information timer, where the tunnel identification information is part of a set of tunnel identification information associated with the communication device, and where each of the set of tunnel identification information is for a different network node. In one embodiment, establishing communications for the communication device via the network node can be facilitated utilizing the tunnel identification information responsive to a service request, where the facilitating of the establishing communications is performed without transmitting a modify bearer request and a modify bearer response between the SGW and an MME.

In one embodiment, establishing communications for the communication device via a second network node can be facilitated utilizing second tunnel identification information responsive to a determination that the second network node is included in a set of network nodes that were last utilized by the communication device. In one embodiment, the second tunnel identification information can be stored by the SGW for a second downlink tunnel associated with the communication device and the second network node that was previously inactive, where the facilitating of the establishing communication is performed without transmitting a modify bearer request and a modify bearer response between the SGW and the MME. In one embodiment, a state change for the communication device from an idle state to an active state can be detected; and responsive to the state change, the tunnel identification information can be marked as active. In one embodiment, establishing communications for the communication device via the network node can be facilitated utilizing the tunnel identification information without transmitting a modify bearer request and a modify bearer response between the SGW and the MME. In one embodiment, the request can include a persistence flag indicating that the tunnel identification information is to be stored by the SGW.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

In one or more embodiments, server(s) 501 can be one or more network elements functions as the MME, the SGW, or the eNB as described with respect to systems 100 and 200 of FIGS. 1 and 2. Server 501 can perform function 562 which includes storing tunnel identification information and marking tunnels as active or inactive and thereby provide communication services to the CDs 501, 502, 503 and 505 utilizing one or more persistent tunnels (e.g., without utilizing MBR signaling). CDs 501, 502, 503 and 505 can be adapted with software to perform function 572 to utilize the services of the server 501 similar to the functions described for communication devices of FIGS. 1 and 2 and in accordance with data flow 300 of FIG. 3 and method 400 of FIG. 4. In one embodiment, server 501 can be an integral part of the application server(s) 517 performing function 574, which can be substantially similar to function 562 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
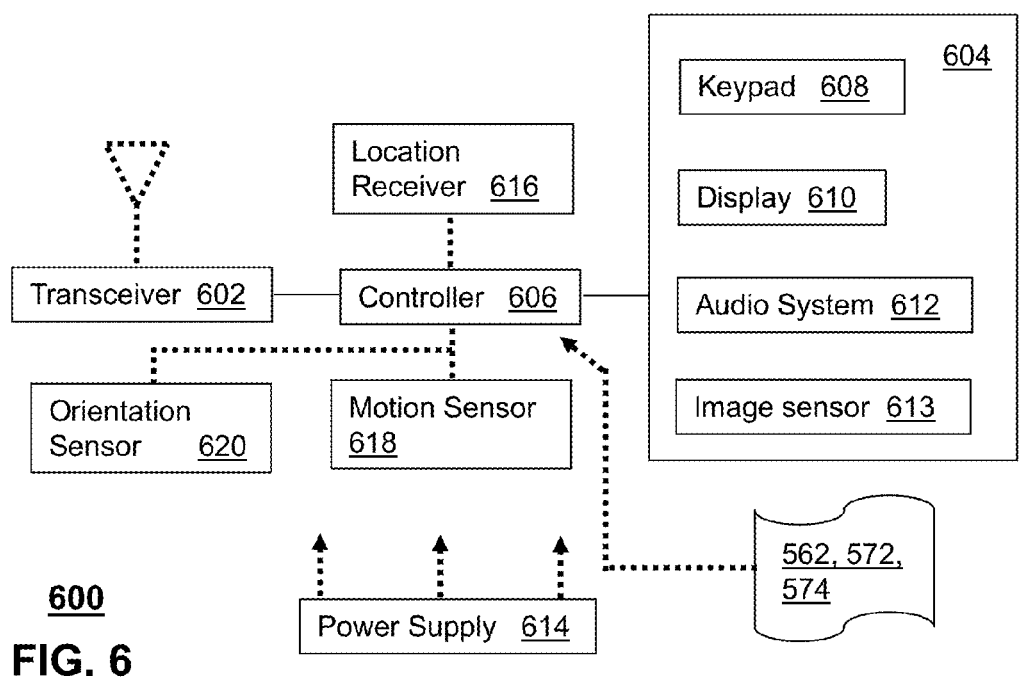
FIG. 6 depicts an illustrative embodiment of a communication device that provides or otherwise facilitates communication services using one or more persistent tunnels.

FIG. 6 depicts an illustrative embodiment of a communication device 600. Communication device 600 can serve in whole or in part as an illustrative embodiment of the network or end user devices depicted in, or otherwise described with respect to, FIGS. 1, 2 and 5. Communication device 600 in whole or in part can be configured to perform portions of data flow 300 of FIG. 3 and/or method 400 of FIG. 4. For example, communication device 600 can provide a service request to a network node (e.g., an eNB), where the providing of the service request causes the network node to facilitate establishing a communication session for the communication device utilizing tunnel identification information for an inactive tunnel without a modify bearer request and a modify bearer response being transmitted between an MME and a SGW, and where the tunnel identification information is stored at theme and the SGW. The communication device 600 can provide communication services via the communication session. The inactive tunnel can be previously established according to a general packet radio service tunneling protocol. The communication session can utilize a second tunnel associated with a second network node responsive to the communication device 600 moving into a coverage area associated with the second node, where the second tunnel is established based on a second modify bearer request being transmitted from the MME and the SGW responsive to a determination that the second network node is not included in a set of network nodes that were last utilized by the communication device.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of MME 110, SGW 120, and/or eNB 130, as well as the IMS CDs 501-502 and PSTN CDs 503-505 of FIG. 5. It will be appreciated that the communication device 600 can also represent other devices that can operate in the systems of FIGS. 1, 2 and/or 5 such as a gaming console and a media player. In addition, the controller 606 can be adapted in various embodiments to perform the functions 562, 572 and/or 574.

Upon reviewing the aforementioned embodiments, it would be evident to an artisan with ordinary skill in the art that said embodiments can be modified, reduced, or enhanced without departing from the scope of the claims described below.

During end user state transitions between idle and active, instead of completely deleting and re-establishing the tunnels, the MME, eNB and SGW can mark the tunnel as active/inactive while still retaining the tunnel ID values of other endpoint. As long as the end user device is on the same eNB, the state of these tunnels can be switched between active/inactive based on the end user state active/inactive without relaying tunnel information back and forth between eNB-MME-SGW for idle to active transition (e.g., for UE-triggered Service Request).

In one or more embodiments, a reduction in signaling and CPU capacity on the MME, the SGW and/or the eNB can be realized. The reduction in signaling can include a reduction in the number of Modify Bearer Request/Response Transactions between the MME and the SGW. One or more of the exemplary embodiments can avoid communication devices, which use multiple APNs (e.g., for multiple services such as IMS, phone, broadband, and so forth), generating a separate MBR for each APN, and creating traffic for the MME and the SGW. One or more of the exemplary embodiments can be applied to Machine-to-Machine (M2M) and/or Industrial Internet, where devices (e.g., sensors) are stationary or have low mobility, but have more frequent network-access requirements to send/receive granular data.

One or more of the exemplary embodiments, can enhance end-to-end communication and data analytics with low latency and without putting significant load on the network mobility elements (e.g., eNB, MME, and/or SGW). One or more of the exemplary embodiments can be implemented through use of additional logic on the eNB, the MME and the SGW and utilizing memory on the MME, the SGW, and the eNB to store and/or retain tunnel identification information such as downlink TEIDs. For example, a TEID can be a 32 bit number, while and end user device's GUTI (RAN identity) is a 76 bit number. As another example, TEIDs can have a one bit flag for active/inactive state on the eNB, the MME and the SGW.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
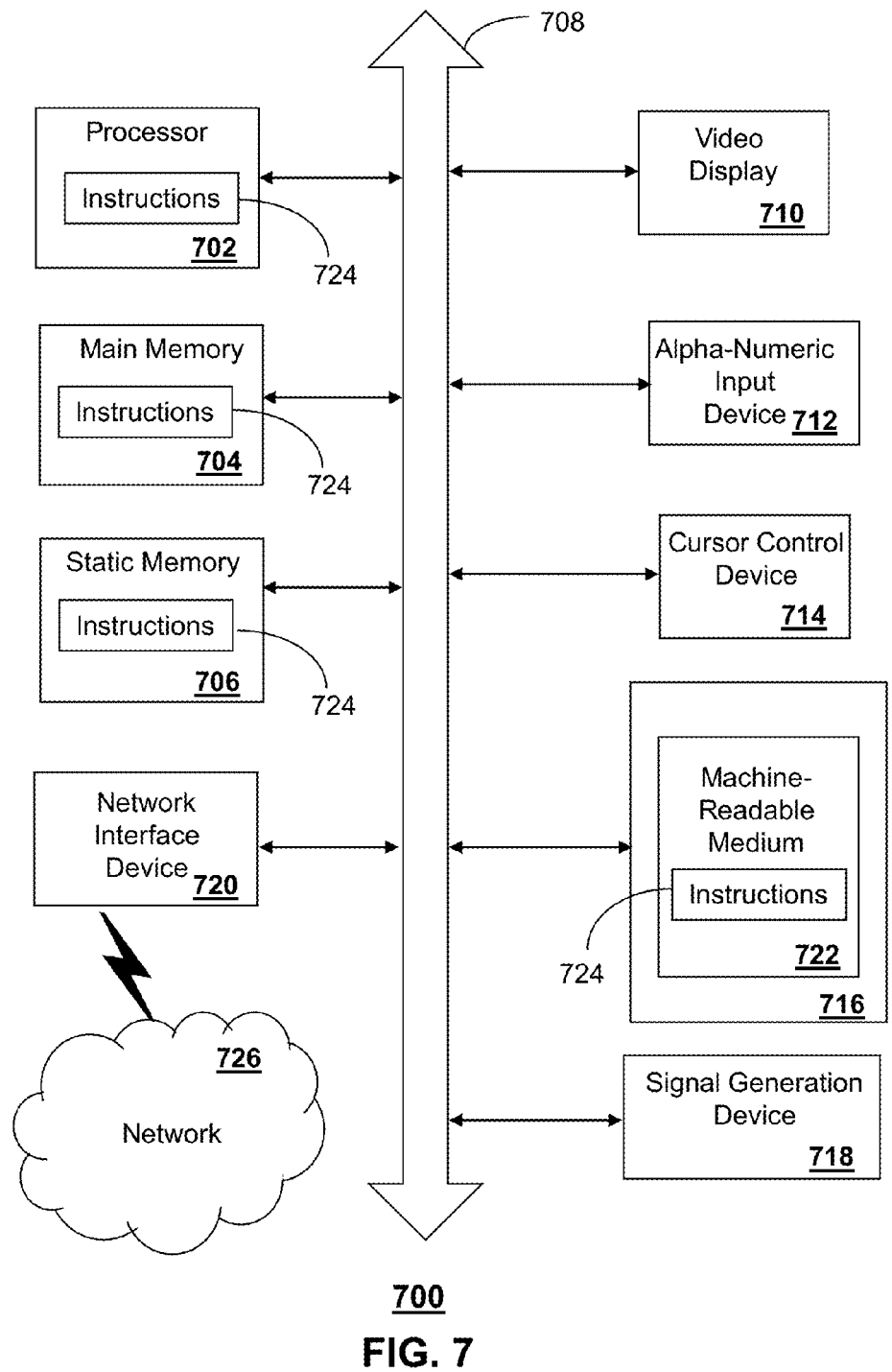
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the MME 110, the SGW 120, the eNB 130, the communication device(s) and other devices of FIGS. 1, 2 and 5-6 in order to enable the use of persistent tunnels and the storage of tunnel identification information. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Figure 8:
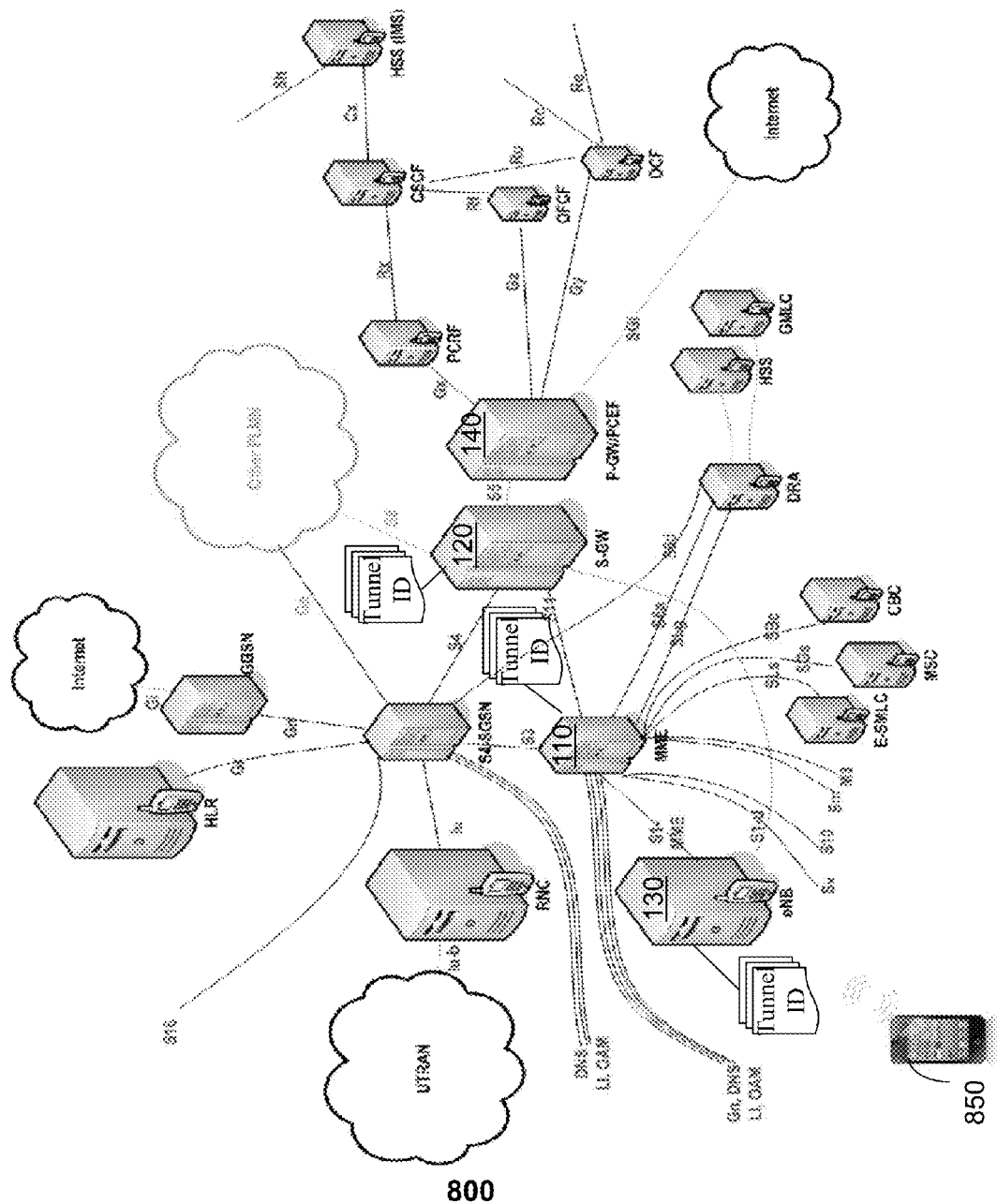
FIG. 8 depicts an illustrative embodiment of a communication system that provides communication services using one or more persistent tunnels.

Referring to FIG. 8, another communication system 800 is illustrated that has MME 110, SGW 120, eNB 130, PGW 140 and an end user device 850. The MME 110 can manage GTP tunnels between the SGW 120 and the eNB 130. These tunnels for an end user device 850 can be switched between active and inactive states (rather than or in addition to deleting and re-establishing some or all of the tunnels). The switching of the tunnel states can correspond to a transition of the end user device 850 between idle and active states. The tunnels can enable the network to provide various communication services to the end user device 850 including voice, video, data and/or messaging services.

System 800 enables multiple tunnels being maintained for the end user device 850 where one or more of the tunnels are in an active state and one or more of the other tunnels are in an inactive state, such as a single tunnel being active while the other tunnels are inactive. In one or more embodiments, the MME 110, the SGW 120, and/or the eNB 130 can mark or otherwise annotate the tunnel(s) as active or inactive while still retaining tunnel identification information, such as the Tunnel ID values of the other endpoint. When the end user device 850 is on the same eNB 130, the state of these tunnels can be switched between active or inactive based on the end user device state being active or inactive. In one or more embodiments, MBR signaling between the MME 110 and the SGW 130 can be reduced or eliminated through retaining the tunnel identification information and marking tunnels as active or inactive. In one or more embodiments, persistent tunnels can be maintained for the end user device 850 for up to a particular number (K) of last known eNBs 130 such as neighboring eNBs. In one embodiment, if the end user device 850 has moved out of a coverage area of the K eNBs, then the MME 110 can utilize MBR signaling to set up a new tunnel with the new eNB and the SGW 130. Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    receiving, by a mobility management entity server comprising a processor and a memory, a first request for release of a resource associated with a communication device, the first request being received from a network node;
    storing, by the mobility management entity server in the memory, tunnel identification information for a downlink tunnel associated with the communication device and the network node;
    providing, by the mobility management entity server to a serving gateway, a second request responsive to the first request;
    marking, by the mobility management entity server, the tunnel identification information as inactive responsive to the first request, wherein the providing of the second request to the serving gateway causes the serving gateway to store the tunnel identification information, and wherein the storing of the tunnel identification information continues after the marking; and
    maintaining the downlink tunnel when marked as active or inactive by not tearing down the downlink tunnel when not in use, wherein the downlink tunnel is part of a path of network nodes.

2. The method of claim 1, comprising:
    determining, by the mobility management entity server, a state change for the communication device from an idle state to an active state;
    responsive to the state change, marking, by the mobility management entity server, the tunnel identification information as active; and
    facilitating establishing communications for the communication device via the network node utilizing the tunnel identification information for the downlink tunnel.

3. The method of claim 2, comprising:
    deleting, by the mobility management entity server, the tunnel identification information from the memory responsive to expiration of a tunnel identification information timer,
    wherein the tunnel identification information is part of a set of tunnel identification information associated with the communication device, wherein each of the set of tunnel identification information is for a different network node.

4. The method of claim 1, wherein the network node comprises an evolved node B, wherein the downlink tunnel is established according to a general packet radio service tunneling protocol, and wherein the receiving of the first request by the mobility management entity server is responsive to the network node detecting expiration of an inactivity timer for the communication device.

5. The method of claim 1, comprising:
    facilitating establishing communications for the communication device via the network node utilizing the tunnel identification information responsive to a service request generated by the communication device, wherein the facilitating establishing communications is performed without transmitting a modify bearer request and a modify bearer response between the mobility management entity server and the serving gateway.

6. The method of claim 1, comprising:
    facilitating establishing communications for the communication device via the network node utilizing a paging procedure responsive to a service request generated by a network device, wherein the facilitating establishing communications is performed by transmitting a modify bearer request and a modify bearer response between the mobility management entity server and the serving gateway.

7. The method of claim 1 further comprising storing, by the network node, the tunnel identification information for the downlink tunnel associated with the communication device, wherein the second request provided to the serving gateway includes a persistence flag indicating that the tunnel identification information is to be stored.

8. The method of claim 1, comprising:
receiving a service request generated by the communication device, wherein the service request is associated with a second network node; and
providing a modify bearer request from the mobility management entity server to the serving gateway responsive to the service request and responsive to a determination that the second network node is not included in a set of network nodes that were last utilized by the communication device.

9. The method of claim 1, comprising:
receiving a service request generated by the communication device, wherein the service request is associated with a second network node; and
facilitating establishing communications for the communication device via the second network node utilizing second tunnel identification information responsive to the service request and responsive to a determination that the second network node is included in a set of network nodes that were last utilized by the communication device,
wherein the second tunnel identification information is stored in the memory by the mobility management entity server for a second downlink tunnel associated with the communication device and the second network node that was previously inactive,
wherein the facilitating establishing communications is performed without transmitting a modify bearer request and a modify bearer response between the mobility management entity server and the serving gateway.

10. A non-transitory, machine-readable storage medium, comprising executable instructions that, when executed by a processing system including a processor, facilitate performance of operations, comprising:
receiving a request associated with a communication device, the request being received from a mobility management entity server, wherein the request is associated with a resource release message generated by a network node;
storing tunnel identification information for a downlink tunnel associated with the communication device and the network node; and
marking the tunnel identification information as inactive responsive to the request; and
maintaining the downlink tunnel when the downlink tunnel is marked as active or inactive by not tearing down the downlink tunnel when not in use, wherein the downlink tunnel is part of a path of network nodes,
wherein the request includes a persistence flag indicating that the tunnel identification information is to be stored by a serving gateway and the mobility management entity server, and wherein the storing of the tunnel identification information continues after the marking.

11. The non-transitory, machine-readable storage medium of claim 10, wherein the operations further comprise:
deleting the tunnel identification information responsive to expiration of a tunnel identification information timer; and
closing the downlink tunnel responsive to the expiration of the tunnel identification information timer,
wherein the tunnel identification information is part of a set of tunnel identification information associated with the communication device, wherein each of the set of tunnel identification information is for a different network node.

12. The non-transitory, machine-readable storage medium of claim 10, wherein the operations further comprise:
facilitating establishing communications for the communication device via the network node utilizing the tunnel identification information responsive to a service request, wherein the facilitating of the facilitating establishing communications is performed without transmitting a modify bearer request and a modify bearer response between the serving gateway and the mobility management entity server.

13. The non-transitory, machine-readable storage medium of claim 10, wherein the operations further comprise:
facilitating establishing communications for the communication device via a second network node utilizing second tunnel identification information responsive to a determination that the second network node is included in a set of network nodes that were last utilized by the communication device.

14. The non-transitory, machine-readable storage medium of claim 13, wherein the second tunnel identification information is stored by the serving gateway for a second downlink tunnel associated with the communication device and the second network node that was previously inactive, and wherein the facilitating establishing communications is performed without transmitting a modify bearer request and a modify bearer response between the serving gateway and the mobility management entity server.

15. The non-transitory, machine-readable storage medium of claim 10, wherein the operations further comprise:
determining a state change for the communication device from an idle state to an active state; and
responsive to the state change, marking the tunnel identification information as active.

16. The non-transitory, machine-readable storage medium of claim 15, wherein the
facilitating establishing communications is performed without transmitting a modify bearer request and a modify bearer response between the serving gateway and the mobility management entity server.

17. The non-transitory, machine-readable storage medium of claim 10, wherein the persistence flag further indicates that the tunnel identification information is to be stored by the network node, and wherein the processor comprises a plurality of processors operating in a distributed processing environment.

18. A communication device, comprising:
a processing system including a processor; and
a memory that stores executable instructions that, when executed by the processing system, facilitate performance of operations, comprising:
providing a service request to a network node, wherein the providing of the service request causes the network node to facilitate establishing a communication session for the communication device utilizing tunnel identification information for a tunnel marked as an inactive tunnel while being maintained in an open state without a modify bearer request and a modify bearer response being transmitted between a mobility management entity server and a serving gateway, the tunnel identification information for the inactive tunnel being stored at the mobility management entity server and the serving gateway, and wherein the inactive tunnel is maintained by not tearing down the inactive tunnel when not in use, wherein the inactive tunnel is part of a path of network nodes; and providing communication services via the communication session.

19. The communication device of claim 18, wherein the network node comprises an evolved node B, and wherein the inactive tunnel was established according to a general packet radio service tunneling protocol, and wherein the communication session is performed via the network node utilizing the tunnel identification information when the network node is part of a past utilized set of network nodes.

20. The communication device of claim 18, wherein the communication session utilizes a second tunnel associated with a second network node responsive to the communication device moving into a coverage area associated with the second network node, wherein the second tunnel is established based on a second modify bearer request being transmitted from the mobility management entity server to the serving gateway responsive to a determination that the second network node is not included in a set of network nodes that were last utilized by the communication device, and wherein the processor comprises a plurality of processors operating in a distributed processing environment.

* * * * *